UNITED STATES PATENT OFFICE.

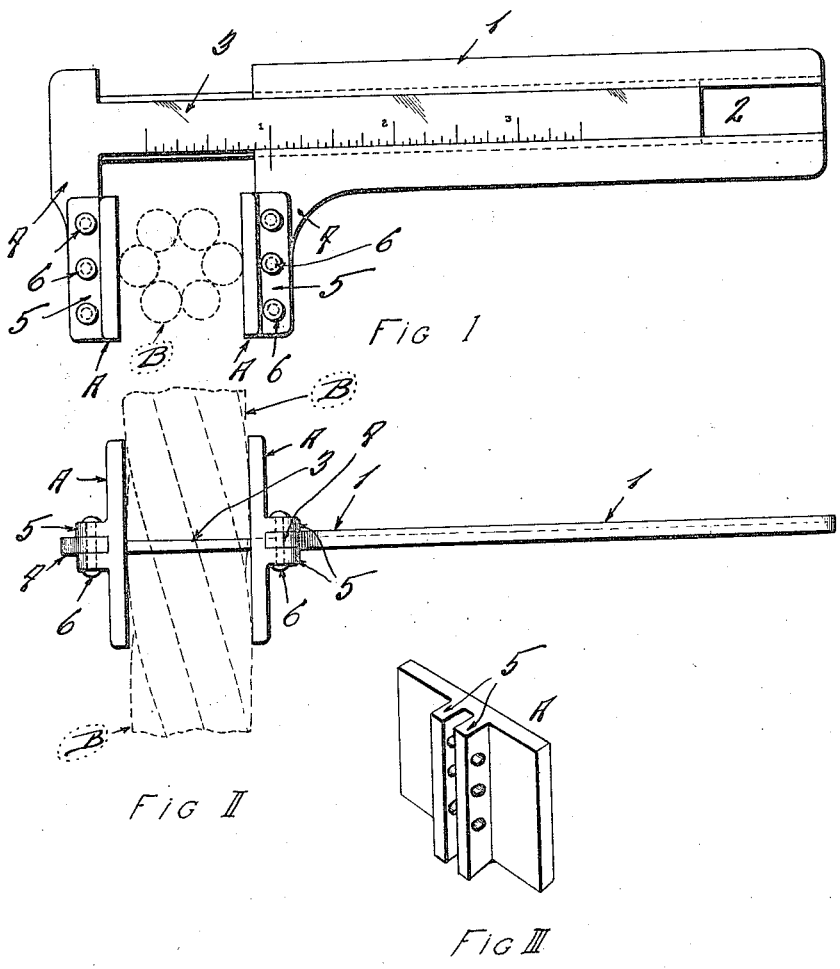

HARRY J. LESCHEN, OF WEBSTER GROVES, MISSOURI, ASSIGNOR TO A. LESCHEN & SONS ROPE COMPANY, OF ST. LOUIS, MISSOURI, A CORPORATION OF MISSOURI.

CALIPERS.

1,424,492.   Specification of Letters Patent.   Patented Aug. 1, 1922.

Application filed February 3, 1921. Serial No. 442,216.

*To all whom it may concern:*

Be it known that I, HARRY J. LESCHEN, a citizen of the United States of America, and a resident of Webster Groves, in the county of St. Louis, in the State of Missouri, have invented certain new and useful Improvements in Calipers, of which the following is a full, clear, and exact description, reference being had to the accompanying drawings, forming a part of this specification.

This invention relates to improvements in calipers, and more particularly to calipers adapted for use in measuring objects having varying outer faces, such, for example, as wire rope and screws having helical faces, as well as other articles having recesses or the like in the faces to which the calipers are applied.

Prior to this invention, ordinary calipers with narrow jaws have been used to measure wire rope and similar articles, and since the true diameter of an article of this kind is the diameter of a circle which will enclose it, considerable difficulty has been experienced in determining the desired measurement. In most instances, when one jaw of a pair of calipers is properly engaged with the outermost portion of a helical strand in a wire rope, the other caliper jaw will lie opposite to or within a helical recess at the opposite side of the rope.

My object is to produce a pair of calipers whereby the precise diameter of an article of this kind can be easily and quickly ascertained, and this is preferably accomplished through the medium of laterally extended jaws having inner faces which are broad enough to span the helical recesses, so as to engage the outermost portions of two adjacent coils, without extending into the recesses between the coils. This improvement enables the caliper jaws to be properly engaged with opposite sides of a rope, or the like, and it is not necessary for the jaws to engage diametrically opposite points on the rope, the true diameter being readily ascertained by merely applying the jaws to any convenient portions of the rope.

Fig. I is a side elevation of a pair of calipers embodying the features of this invention, a wire rope being shown by dotted lines between the caliper jaws.

Fig. II is an inverted plan view of the device shown in Fig. I.

Fig. III is a perspective view of one of the caliper jaws.

As an illustration of one form of calipers to which the invention may be applied, I have shown a pair of calipers comprising a guidebar 1 having a recess 2, in which a beam 3 is slidably mounted. Jaw holders 4 extend laterally from the bar 1 and beam 3, respectively, and these holders 4 are similar to the jaws of an ordinary pair of calipers of the type herein shown.

A designates oppositely disposed jaws extending laterally from the respective jaw holders, each of said jaws A being in the form of a broad, deep plate having a flat inner face which is broad enough to span any one of the helical recesses in a wire rope B, as shown by Fig. II. The outer face of each flat plate is provided with a pair of lugs 5 between which one of the jaw holders 4 is located. Rivets 6, or other suitable fastening devices, pass through lugs 5 and jaw holders 4 to secure the jaws to their respective holders.

The beam 3 is slidably mounted in the guidebar 1 to permit the jaws A to be moved toward and away from each other, and said beam may be graduated as shown in Fig. I, for the purpose of indicating the diameter of the object engaged by the jaws.

I claim:

1. In a device for measuring the external diameters of wire rope, a pair of calipers comprising a guidebar, a graduated beam slidably mounted in said guidebar, jaw holders extending laterally from said beam and guidebar, a pair of oppositely disposed jaws extending laterally from the respective jaw holders, each of said jaws being in the form of a broad, deep plate having a flat inner face which is broad enough to span the helical recess in the rope, the outer face of each plate being provided with a pair of lugs between which one of said jaw holders is located, and rivets passing through said lugs and jaw holders to secure the jaws to their respective holders.

2. In a device for measuring the external diameters of wire rope, a pair of calipers comprising a guidebar, a graduated beam slidably mounted in said guidebar, jaw holders extending laterally from said beam and guidebar, a pair of oppositely disposed jaws extending laterally from the respective jaw holders, each of said jaws being in the form of a broad, deep plate having a flat inner face which is broad enough to span the helical recess in the rope, and means whereby said jaws are attached to said jaw holders.

In testimony that I claim the foregoing I hereunto affix my signature.

HARRY J. LESCHEN.